United States Patent [19]
Perkins

[11] 4,293,855
[45] Oct. 6, 1981

[54] COMMUNICATION DEVICE

[76] Inventor: Arthur T. Perkins, 3120 107th Ave. SE., Bellevue, Wash. 98004

[21] Appl. No.: 108,412

[22] Filed: Dec. 31, 1979

[51] Int. Cl.³ .............................................. G06F 3/14
[52] U.S. Cl. .................................... 340/712; 340/311; 340/802; 340/365 R; 340/365 VL
[58] Field of Search .......... 340/711, 311, 802, 365 R, 340/712, 365 VL, 365 S, 706

[56] References Cited

U.S. PATENT DOCUMENTS

| | | | |
|---|---|---|---|
| 3,347,986 | 10/1967 | Gilbert | 340/365 R |
| 3,560,964 | 2/1971 | Bedell et al. | 340/365 R |
| 3,584,398 | 6/1971 | Meyer et al. | 35/6 |
| 3,638,217 | 1/1972 | Sutherland | 340/365 R |
| 3,651,512 | 3/1972 | Summers | 340/365 R |
| 3,676,615 | 7/1972 | Wiedmer | 340/365 R |
| 3,808,705 | 5/1974 | Schmoyer | 35/6 |
| 3,818,448 | 6/1974 | Wilkins | 340/792 |
| 3,846,783 | 11/1974 | Apsell et al. | 340/311 |
| 3,848,249 | 11/1974 | Meiri | 340/802 |
| 3,911,424 | 10/1975 | Gianuzzi et al. | 340/365 R |
| 3,913,089 | 10/1975 | Albrecht | 340/792 |
| 3,925,779 | 12/1975 | Gerstenhaber | 340/331 |
| 3,976,995 | 8/1976 | Sebestyen | 340/792 |
| 4,007,443 | 2/1977 | Bromberg et al. | 340/365 R |
| 4,038,651 | 7/1977 | McGraw | 340/311 |
| 4,048,439 | 9/1977 | Gabus | 340/365 R |
| 4,057,790 | 11/1977 | Fleming et al. | 340/311 |
| 4,075,621 | 2/1978 | Salmon | 340/331 |
| 4,191,481 | 3/1980 | Gabus | 340/365 R |

*Primary Examiner*—Marshall M. Curtis
*Attorney, Agent, or Firm*—Graybeal & Uhlir

[57] ABSTRACT

A communication device is disclosed. The device comprises keyboard means having a plurality of keys. The keys are operable to enable the user to create a message to be communicated, or to select one of a plurality of predetermined messages to be communicated. User operable feedback switch means including a sequential display means presents each key from the keyboard means to the user. The feedback switch means is further operable during the time a key is presented to duplicate the operability of the key being presented. Display means presents either the message to be communicated as it is being created by the user or the selected predetermined message. Housing means having a first face mounts the keyboard means and the user operable feedback switch including the sequential display means. A second face mounts the display means.

19 Claims, 15 Drawing Figures

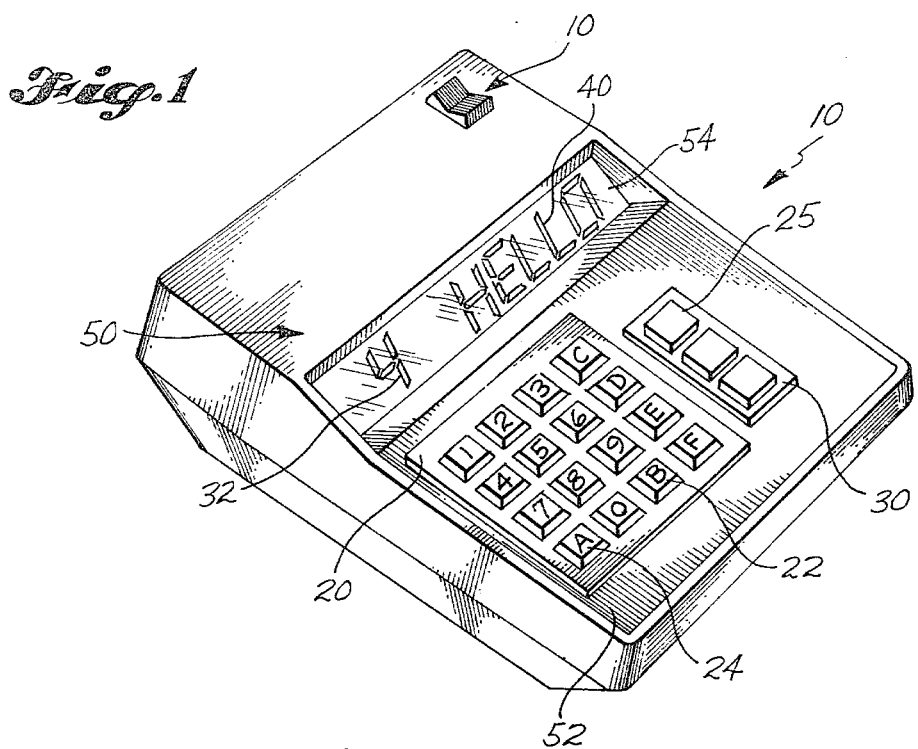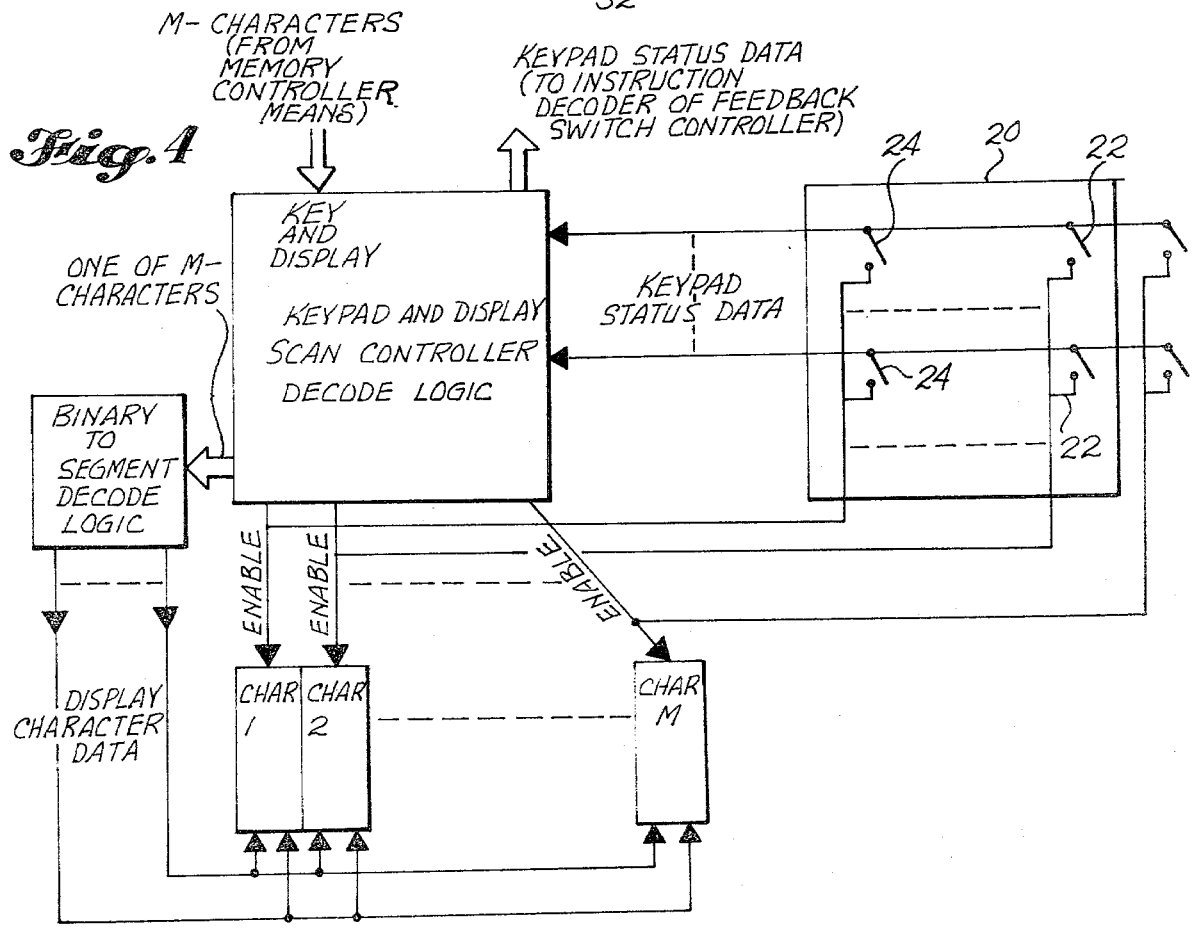

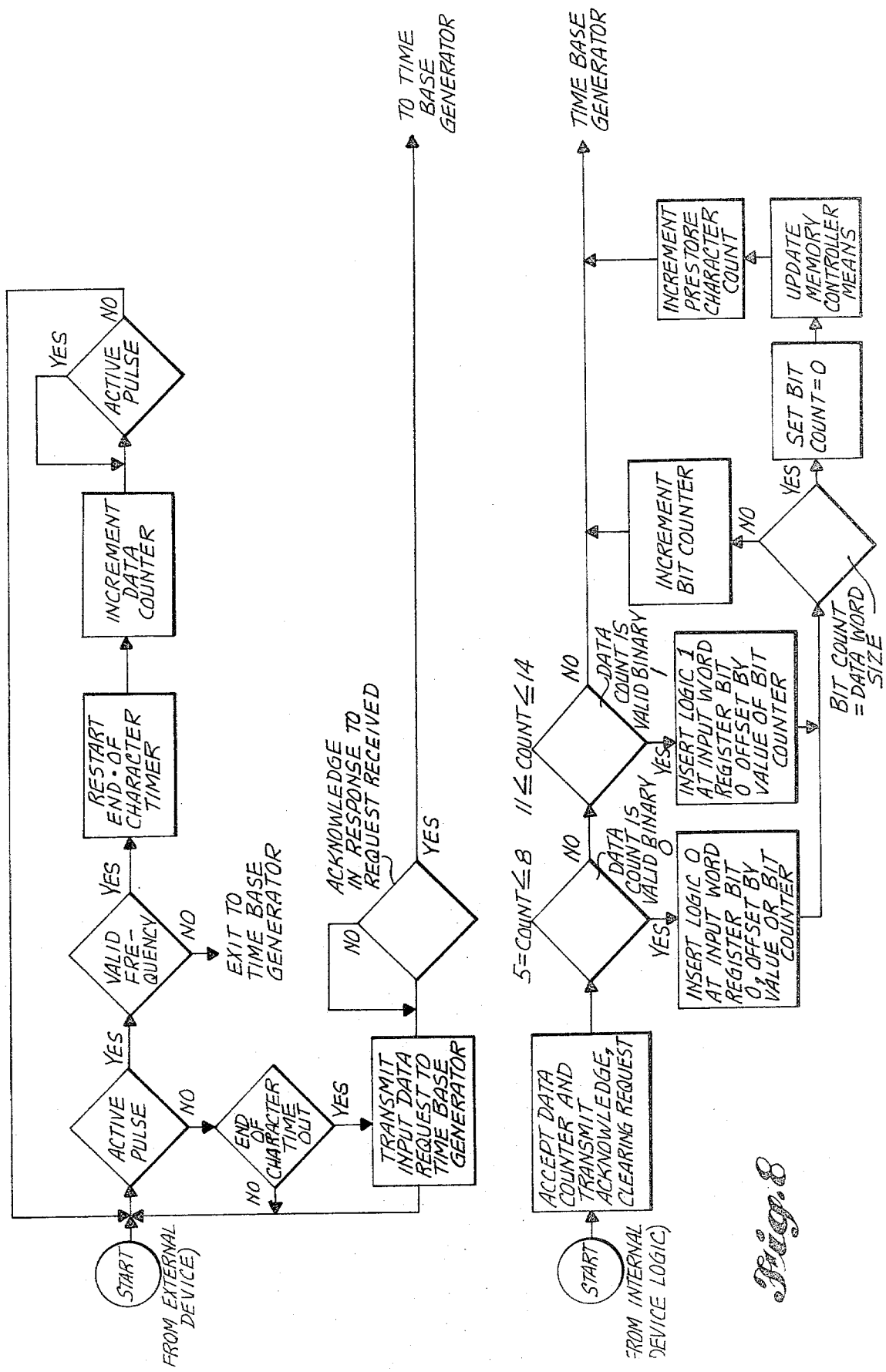

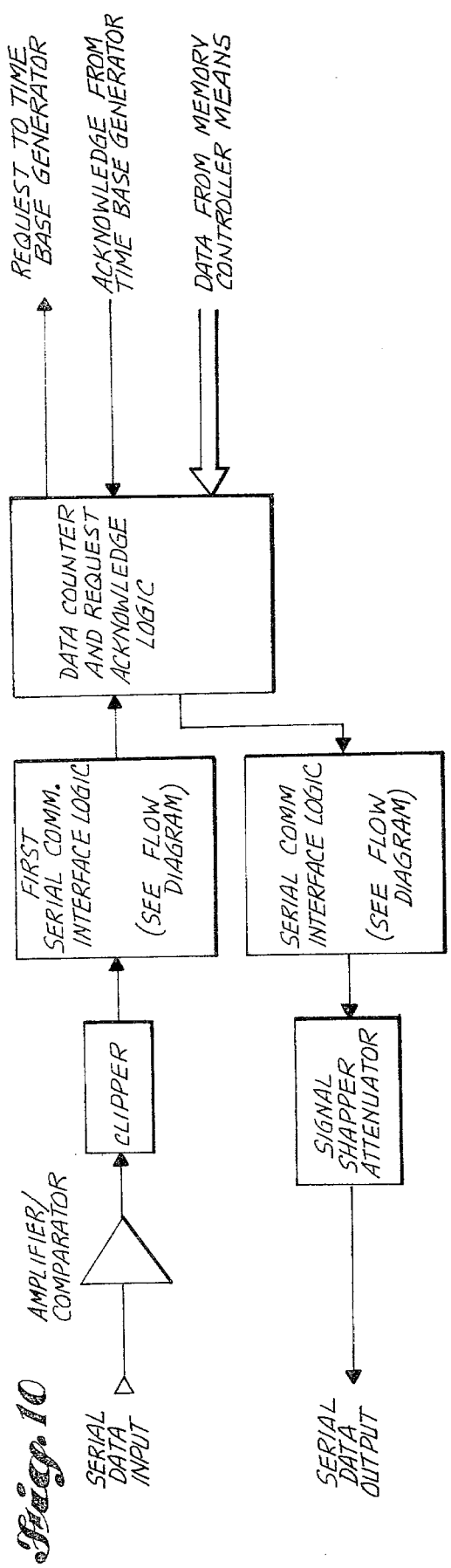
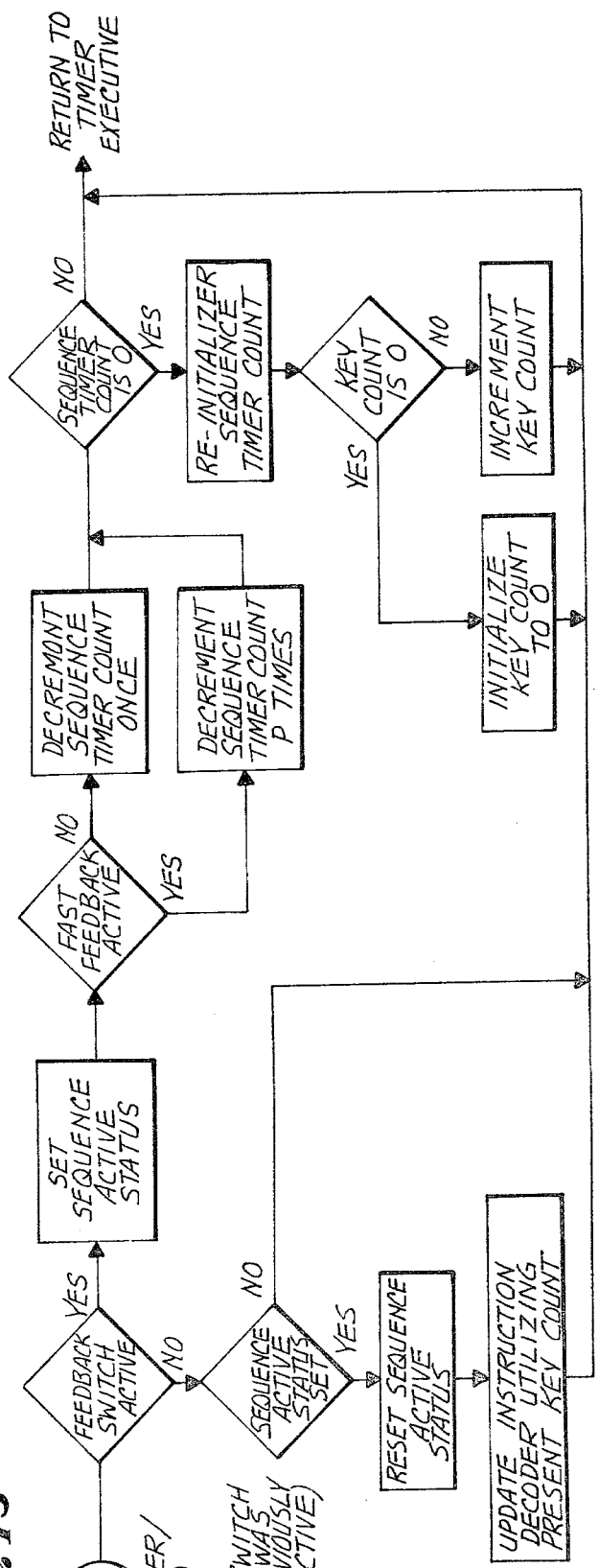
Fig. 10
Fig. 13

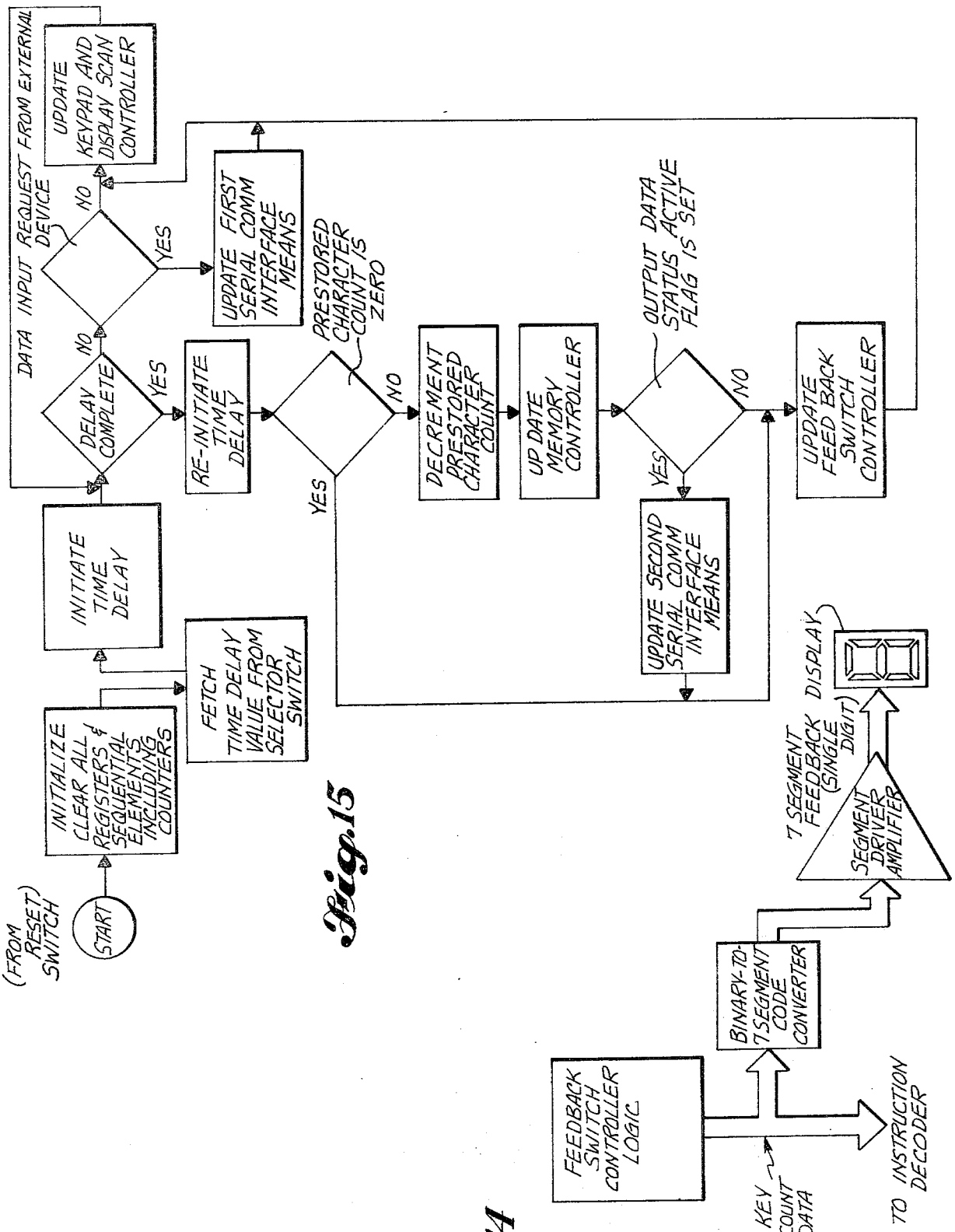

COMMUNICATION DEVICE

TECHNICAL FIELD

The present invention relates to communication devices, and more particularly to devices enabling persons having oral and/or motor impairments to communicate.

BACKGROUND ART

Devices to facilitate communication by people having handicaps exist in the prior art. One such device, as shown by Wilkins, U.S. Pat. No. 3,818,448, generally comprises a matrix of lamps activated by row and column switches. Disposed below each lamp is an indicator, such as a number or a pictorial drawing representing the message to be communicated. When a lamp is illuminated by activating the row and column switches through an electrical circuit energized by repeated movement of some portion of the handicapped person's body, the needs of the person can be communicated. The disclosed device is restricted in communication capabilities being limited by the number of lamps and associated indicators. Furthermore, the disclosed device prevents the handicapped person from freely expressing himself in that the device is limited to a third party's concept of important words or ideas to be communicated. A somewhat similar device is shown by Summers, U.S. Pat. No. 3,651,512.

Another device facilitating communication by persons having oral and/or motor impairments is shown by Meiri, U.S. Pat. No. 3,848,249. The device disclosed comprises a user operable switch energizing various external mechanical means controlling the operation of external devices such as a telephone, or the like. The user initiates operation by activating the switch enabling a motor-driven mechanism to rotate through one complete cycle of numbers corresponding to the external devices. As the numbers are presented to the handicapped user, the switch is reactivated at the desired number location causing the external mechanical means to operate the desired external device. The disclosed device does not provide the user a means of communicating with others since it merely activates an external device which in turn controls other external devices.

Another device usable by persons having handicaps is shown by Gerstenhaber, U.S. Pat. No. 3,925,779. This disclosed device comprises a housing containing a keyboard panel and a message sender screen. The message appearing on the message sender screen is operably responsive to keys on the keyboard panel so that upon depression of any particular key a specific message appears on the sender screen. Message to key correlation may change by replacing certain components within the device, such as the internal circuit board or the like. The disclosed device is inherently limited in that the message communicated is limited to fixed and predetermined expressions.

Still another device is shown by Salmon, U.S. Pat. No. 4,075,621, which discloses a hand held communication aid. The device essentially comprises a casing containing a keyboard, and a visual light emitting diode display facing toward an individual to whom the communication is directed. By operating individual keys on the keyboard, the user is able to communicate a message. The disclosed communicator does not provide the ability to communicate a plurality of predetermined messages nor does it provide capability of storing and subsequently communicating the messages. In addition the device may be rendered inoperable by those having motor handicaps.

The present invention has been developed by working with handicapped individuals, and by perceiving the need for communication devices more adapted for their unique needs than any device existing in the prior art. The present invention provides a portable communication device for use by individuals having oral impairments through the use of a keyboard enabling the individual to create a message to be communicated by selecting the individual alphanumeric characters in the message. For those individuals having oral and motor impairments, the present invention provides a feedback switch essentially duplicating the capability of the keyboard. The feedback switch may be separate and apart from the communication device, such as being attached to the user's body, enabling operation by movement of a body member. A storage capability is provided to enable the handicapped user to both communicate a repertoire of short phrases, such as requests for help or the like, or to store messages received from like units, tape recorders, or other communication devices. Finally, a plurality of serial interfaces enable the user to communicate with and control the operability of certain external devices connected to the present invention.

SUMMARY OF THE INVENTION

According to one aspect of the present invention, a communication device comprises keyboard means having a plurality of keys. The keys are operable to enable the user to create a message to be communicated by selecting the alphanumeric characters forming the message, or by selecting one of a plurality of predetermined messages to be communicated. User operable feedback switch means, including a sequential display means, presents to the user each key from the keyboard means. The user operable feedback switch means is operable during the time a key is presented to duplicate the operability of the key being presented. Display means presents either the message to be communicated as it is being created by the user, or the selected predetermined message. Housing means has a first face for mounting, in part, the keyboard means and the user operable feedback switch means. The housing means further has a second face being at an acute angle with respect to the first face for mounting the display means, including the sequential display means.

It is an object of the present invention to provide a small and portable communication device providing rapid and precise communication by people of normal intelligence with restricted physical and/or motor handicaps.

Another object of the present invention is to provide a communication device having both sophisticated and creative information exchange capabilities, and information storage capabilities.

A still further object of the present invention is to provide a communication device that is not cost prohibitive to most potential users.

A still further object of the present invention is to provide a communication device having a variety of communication repertoires selected by the user from a convenient device mounted keypad.

A still further object of the present invention is to provide a communication device having a variety of communication repertoires selected by the user from a means remote and apart from the device.

A still further object of the present invention is to provide a communication device having interface and control capabilities compatible with like devices, tape recorders, or other communication devices.

The foregoing, and other objects, features and advantages of the present invention will become more apparent in light of the detailed description of the best mode of carrying out the invention set forth hereafter, and illustrated in the accompanying drawings.

BRIEF DESCRIPTION OF THE DRAWINGS

FIG. 1 is a perspective view of one embodiment of a typical communication device according to the present invention.

FIG. 4 is a block diagram showing a typical implementation of the keypad and display scan controller.

FIG. 8 is a flow diagram showing the typical operation of a first serial communication interface means according to the present invention.

FIG. 10 is a block diagram showing a typical implementation of the first and second serial communication interface means.

FIG. 13 is a flow diagram showing a typical operation of a feedback switch means according to the present invention.

FIG. 14 is a block diagram showing a typical implementation of a feedback switch sequential controller.

FIG. 15 is a flow diagram showing a typical operation of a time base generator according to the present invention.

BEST MODE OF CARRYING OUT THE INVENTION

Figure 2:
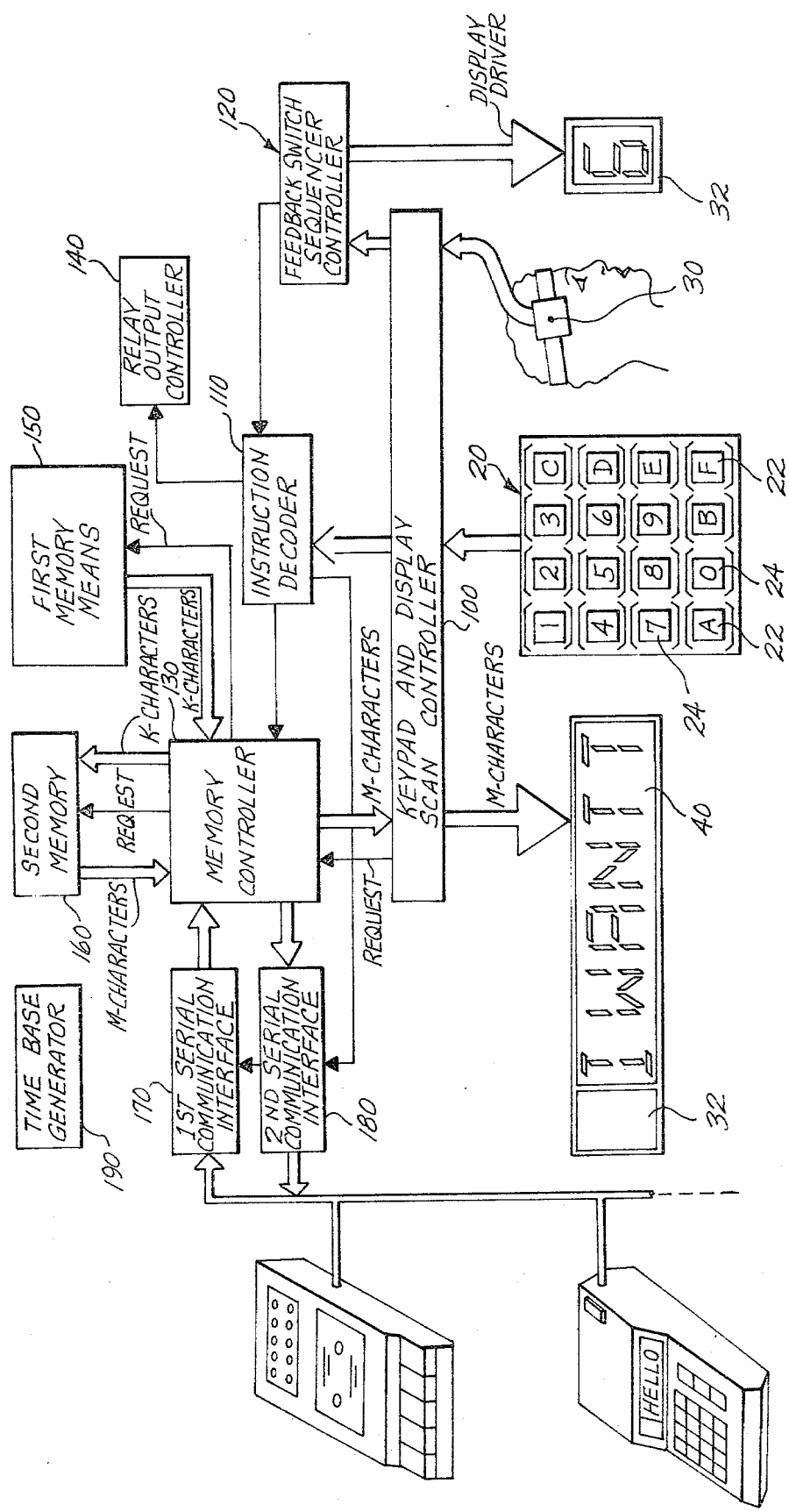
FIG. 2 is a block diagram showing the typical elements of one embodiment of the present invention.

With reference to FIGS. 1 and 2, a communication device according to the present invention is shown at 10, and generally comprises keyboard means 20 operable by the user. Keyboard means has a plurality of keys 22, 24 enabling the user to create a message to be communicated by either selecting the appropriate alphanumeric characters forming the message, or by selecting one of a plurality of predetermined messages to be communicated. User operable feedback switch means 30, including a sequential display means 32, sequentially presents to the user each key from either plurality of keys 22, 24 from the keyboard means. The user operable feedback switch means is operable during the time a key is presented to duplicate the operability of the key being presented, that is, to select either an alphanumeric character forming the message to be communicated, or to select a predetermined message to be communicated. Display means 40 presents either the message to be communicated as it is being created by the user, or presents the selected predetermined message. Housing means, shown generally at 50, has a first face 52 for mounting keyboard means 20 and user operable feedback switch means 30. A second face 54 being at an acute angle with respect to the first face mounts the display means 40, including the sequential display means 32.

With reference to FIG. 2, the user typically operates a key from either plurality of keys 22, 24 on keyboard means 20 to create or choose a message to be communicated. By first operating a key from the plurality of keys 22, the user selects and controls the communication device function or operational mode. By subsequently operating a key or keys from the plurality of keys 24, the user creates an N-digit entry code enabling the user to select a particular letter, numeral or phrase to be communicated, or to control and communicate with external devices such as tape recorders or the like.

The communication device of the present invention has a plurality of selectable device functions or operational modes responsive to the operation (i.e. activation) of one key from the plurality of keys 22 on keyboard means 20. In the preferred embodiment, the selectable device functions are listed below in Table 1.

TABLE 1:

| SELECTABLE DEVICE FUNCTIONS | |
|---|---|
| KEY SELECTED FROM PLURALITY OF KEYS 22 | DEVICE FUNCTION SELECTED |
| A | space |
| B | clear |
| C | backspace |
| D | numbers next |
| E | letters next |
| F | recall |

The selectable device functions control the manner in which the communication device interprets subsequent user activation of a key or keys from the plurality of keys 24. For example, the clear function erases the message communicated on display means 40 and re-initializes the communication device thereby enabling the user to select another device function. The space and backspace device functions are similar to the equivalent functions performed by a standard typewriter and enable the user to shift the message communicated on display means 40 to the left or right directions respectively. The numbers next and letters next device functions cause all keys 24 activated thereafter to be interpreted by the communication device as either numerals or letters, respectively. The recall device function causes all characters stored within the communication device to be transferred to the display means 40 in a readable sequence.

In addition to the selectable device functions, the present invention also has a plurality of user selectable N-digit entry codes responsive to the operation (i.e. activation) of a key or keys from the plurality of keys 24 on keyboard means 20. The N-digit entry code enables the user to select either a particular letter, number or phrase to be communicated, or to control and communicate with external devices such as tape recorders or the like. Table 2 below lists the communication device responses.

to override simultaneous N-digit entry codes or device functions selected from keyboard means. The output of

TABLE 2

| COMMUNICATION DEVICE RESPONSES | | | | | |
|---|---|---|---|---|---|
| N-DIGIT ENTRY CODE | LETTER, NUMBER, PHRASE TO BE COMMUNICATED | N-DIGIT ENTRY CODE | LETTER, NUMBER, PHRASE TO BE COMMUNICATED | N-DIGIT ENTRY CODE | LETTER, NUMBER, PHRASE TO BE COMMUNICATED |
| 0 | 0 | 32 | We | 60 | Will you |
| 1 | 1 | 33 | You | 61 | Please help me |
| 2 | 2 | 34 | What | 62 | I want to |
| 3 | 3 | 35 | Where | 63 | Praise the Lord |
| 4 | 4 | 36 | When | | |
| 5 | 5 | 37 | Why | | |
| 6 | 6 | 38 | Have | 71 | Reset Output 1 |
| 7 | 7 | 39 | Need | 72 | Reset Output 2 |
| 8 | 8 | 3A | Want | 73 | Reset Output 3 |
| 9 | 9 | 3B | Will | 74 | Reset Output 4 |
| | | 3C | And | | |
| 01 | A | 3D | By | 81 | Set Output 1 |
| 02 | B | 3E | For | 82 | Set Output 2 |
| 03 | C | 3F | From | 83 | Set Output 3 |
| 04 | D | 40 | That | 84 | Set Output 4 |
| 05 | E | 41 | The | | |
| 06 | F | 42 | To | | |
| 07 | G | 43 | Not | 9X | Dial Station X |
| 08 | H | 44 | Do | 9E | Answer |
| 09 | I | 45 | Go | 9F | End |
| 10 | J | 46 | Eat | | |
| 11 | K | 47 | Drink | | |
| 12 | L | 48 | Make | | |
| 13 | M | 49 | Ride | | |
| 14 | N | 4A | Walk | | |
| 15 | O | 4B | Love | | |
| 16 | P | 4C | Near | | |
| 17 | Q | 4D | Next | | |
| 18 | R | 4E | With | | |
| 19 | S | 4F | Bathroom | | |
| 20 | T | 50 | Church | | |
| 21 | U | 51 | God | | |
| 22 | V | 52 | Jesus | | |
| 23 | W | 53 | Music | | |
| 24 | X | 54 | Park | | |
| 25 | Y | 55 | Room | | |
| 26 | Z | 56 | Store | | |
| 27 | Blank (Space) | 57 | Stop | | |
| 28 | Period | 58 | Hello | | |
| 29 | Comma | 59 | Goodbye | | |
| 2A | Quote | 5A | Please | | |
| 2B | Dash | 5B | Pretty | | |
| 2C | Plus | 5C | Yes | | |
| 2D | Question | 5D | No | | |
| 2E | Hearts (Symbol) | 5E | Left | | |
| 2F | Diamonds (Symbol) | 5F | Right | | |
| 30 | Clubs (Symbol) | | | | |
| 31 | Spades (Symbol) | | | | |

With reference to FIG. 2, the output of keyboard means 20 representing the user selected device function or the N-digit entry code is routed through the keypad and display scan controller 100 to the instruction decoder 110. The keypad and display scan controller in conjunction with other elements provides the required internal timing and control for the present invention as will be described. The instruction decoder decodes both the user selected device function and the N-digit entry code to enable subsequent operation of the present invention. Feedback switch means 30 including sequential display means 32 (shown as a portion of display means 40 in FIG. 2) essentially operates in parallel with keyboard means 20. The output of the feedback switch means 30 is routed by the keypad and display scan controller to the instruction decoder through the feedback switch sequential controller 120. The feedback switch sequential controller is operable to convert the output from the feedback switch means into an instruction decoder compatible input. A priority system within instruction decoder enables the feedback switch means the instruction decoder is in communication with memory controller means 130 and relay output controller 140 to control the subsequent operation of these elements as will be described more fully below.

First memory means 150 stores a plurality of K-character alphanumeric device responses (see Table 2) with each device response being outputtable to memory controller 130 in response to specific and predetermined device functions and N-digit entry codes as decoded by instruction decoder 110. The memory controller means requests a K-character alphanumeric device response from first memory means 150, inputs and stores the same prior to routing M-characters of the K-character alphanumeric response through the keypad and display scan controller to the display means where the characters are subsequently displayed to the user. Second memory means 160 temporarily stores the entire K-character alphanumeric device response from the first memory means and sequentially outputs the first M-characters of the previously stored device responses through the memory controller means to the display means.

First and second serial communication interface means 170, 180, respectively, are in communication with memory controller 130 to operably control, transfer serial alphanumeric communication device responses to, and receive alphanumeric responses from external devices such as tape recorders or the like.

Internal timing and control for each of the above-identified elements, and for the present invention is provided by the time base generator 190. Each of these elements, as well as other elements comprised in the present invention will next be described in more detail below.

Keypad and Display Scan Controller

The keypad and display scan controller 100 provides the interface between the input and output elements of the present invention (keyboard means 20 and display means 40) and the remaining elements within the communication device. In this capacity, the keypad and display scan controller retrieves the first M characters stored within the second memory means 160 and transfers these characters to the display means 40. In addition, the keypad and display scan controller monitors the status of the plurality of keys 22, 24 on keyboard means 20 or the feedback switch means 30 and transfers this status information (i.e. key activated or remotely activated) to the feedback switch controller 120 or the instruction decoder 110.

Figure 3:
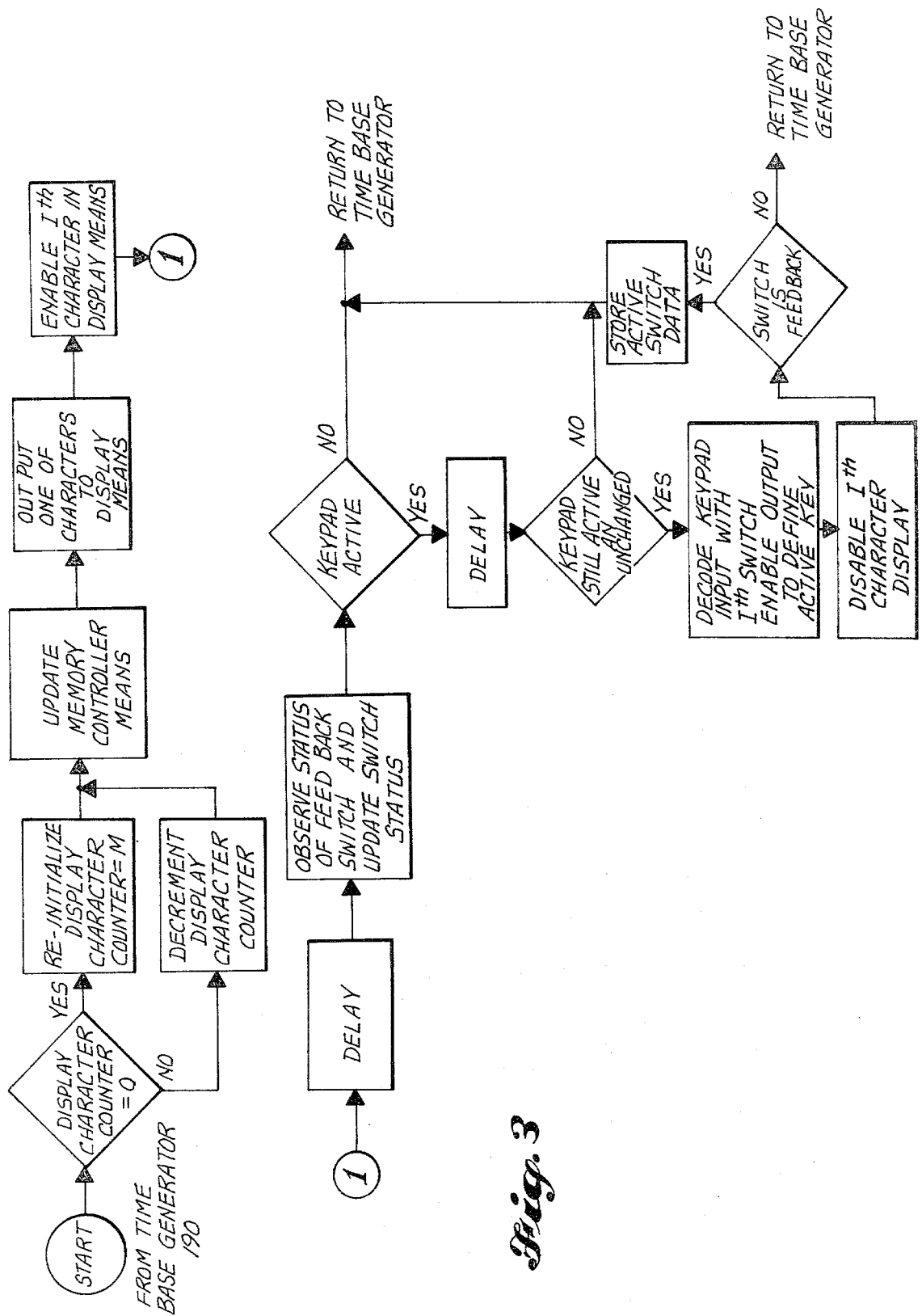
FIG. 3 is a flow diagram showing the typical operation of a keypad and display scan controller according to the present invention.

With reference to FIGS. 3 and 4, both the display means 40 and the keyboard means 20 are of the scanning type (time-multiplexed) whereby the keypad and display scan controller enables each display character and keypad column serially with respect to time. In conjunction with the above, the keypad and display scan controller routes one of M-characters to display decode logic and inputs keypad status data during each successive enable. To control the sequencing of the enable lines, the device uses a display character counter within the keypad and display scan controller. The character counter is operated by peripheral logic also located within the keypad and display controller as shown in FIG. 3. The display character counter is operable to count from M representing the number of characters available for display at any one time on the display means 40 to a count of zero. The display character counter is returned back to the value of M after reaching a count of zero. In the preferred embodiment, M has a value of twelve. As will be described more fully below, the count of the display character counter is decreased by one each time the keypad and display scan controller is operated from the time base generator. Immediately after the count is decreased, the character to be displayed associated with that count is retrieved from the second memory means. As best shown in FIG. 4, the character is then routed to binary to segment decode logic which converts the character to be displayed as it was stored in second memory means into a form suitable for viewing on display means 40. In one embodiment of the present invention, the conversion is accomplished through the use of a lookup table implemented by a microcomputer; however, it is to be understood that the same function can be performed by the use of hardware elements within the keypad and display scan controller without departing from the teachings of the present invention. After outputting the character from the second memory means associated with the count in the display character counter, the keypad and display scan controller decode logic enables only the character in display means 40 that matches the display character count in the display character counter, thereby causing only the appropriate character in the display means to be illuminated. The character is enabled for a minimum duration to ensure adequate brightness.

In addition to enabling a specific display character, the keypad and display scan controller decode logic enables one column of the row-column type keyboard means 20 and feedback switch means 30. The row outputs representing the keypad status data are applied in a parallel manner to the keypad and display scan controller where they are decoded to determine which key from the plurality of keys 22, 24 is active, or if the feedback switch means 30 is active. If the keypad and display scan controller decodes an active key from keyboard means 20, the instruction decoder is enabled. If the keypad and display scan controller decode logic decodes an active feedback switch means 30, further control of the present invention is accomplished by the time base generator as will be described below.

Instruction Decoder

With reference to FIG. 2, the instruction decoder 110 is in communication with keyboard means 20 and feedback switch means 30 through the keypad and display scan controller 100. The instruction decoder is operable to decode the communication device function and the communication device N-digit entry code selected from either the keyboard means or the feedback switch means.

Figure 5:
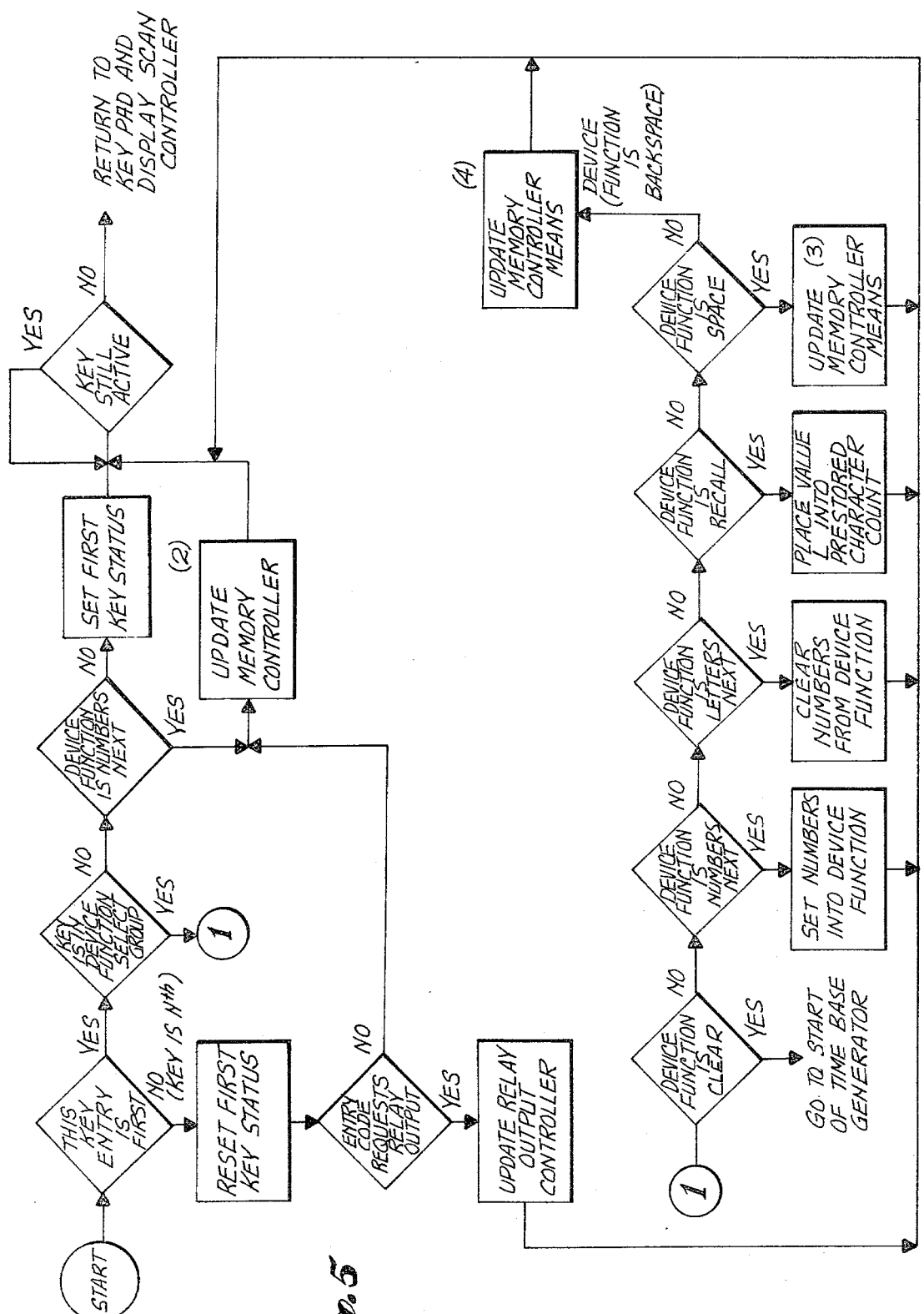
FIG. 5 is a flow diagram showing the typical operation of an instruction decoder according to the present invention.

The instruction decoder is enabled upon the closure (activation) of a key from either plurality of keys 22, 24 or the feedback switch means and receives key identification data from either the keypad and display scan controller or the feedback switch sequential controller 120, as appropriate. With reference to FIG. 5, the instruction decoder evaluates the keypad status data from the keypad and display scan controller and conveys the results of the status evaluation to the appropriate subsystem within the communication device.

With reference to FIG. 5, most alphanumeric device responses require the selection of an N-digit entry code, where N has a value of from between one to two digits. Accordingly, the instruction decoder first determines whether the current entry digit, combined with the sum of the previously selected entry digits since the last alphanumeric response outputted constitutes a sufficient number of digits compatible with the existing device function to define a valid N-digit entry code. It should be noted that a digit in this sense is equivalent to operation of a key from keyboard means 20 or feedback switch means 30. If the current key is not the first key operated, the instruction decoder assumes the entry code is a valid entry code requiring either a new alphanumeric device response or a relay closure as will be described below. If the current key is the first key operated subsequent to the last alphanumeric device response, the instruction decoder determines whether the key is either a device function or whether the communication device is in the numbers next mode. The determination is made by observing the value of the key entry and numbers next status register. If neither of these conditions apply, the entry is insufficient to define an entry code and subsequent control of present invention reverts back to the keypad and display scan controller after the first key status register has been set and the keypad made inactive.

If the first key operated selected a device function, the operational mode of the communication device will be shown in Table 1. If the latest key operated was not a device function select and the device is in the numbers next mode, the key operated by the user defines a character and the instruction decoder logic passes subsequent control to the memory controller means 130.

Memory Controller Means

Figure 6:
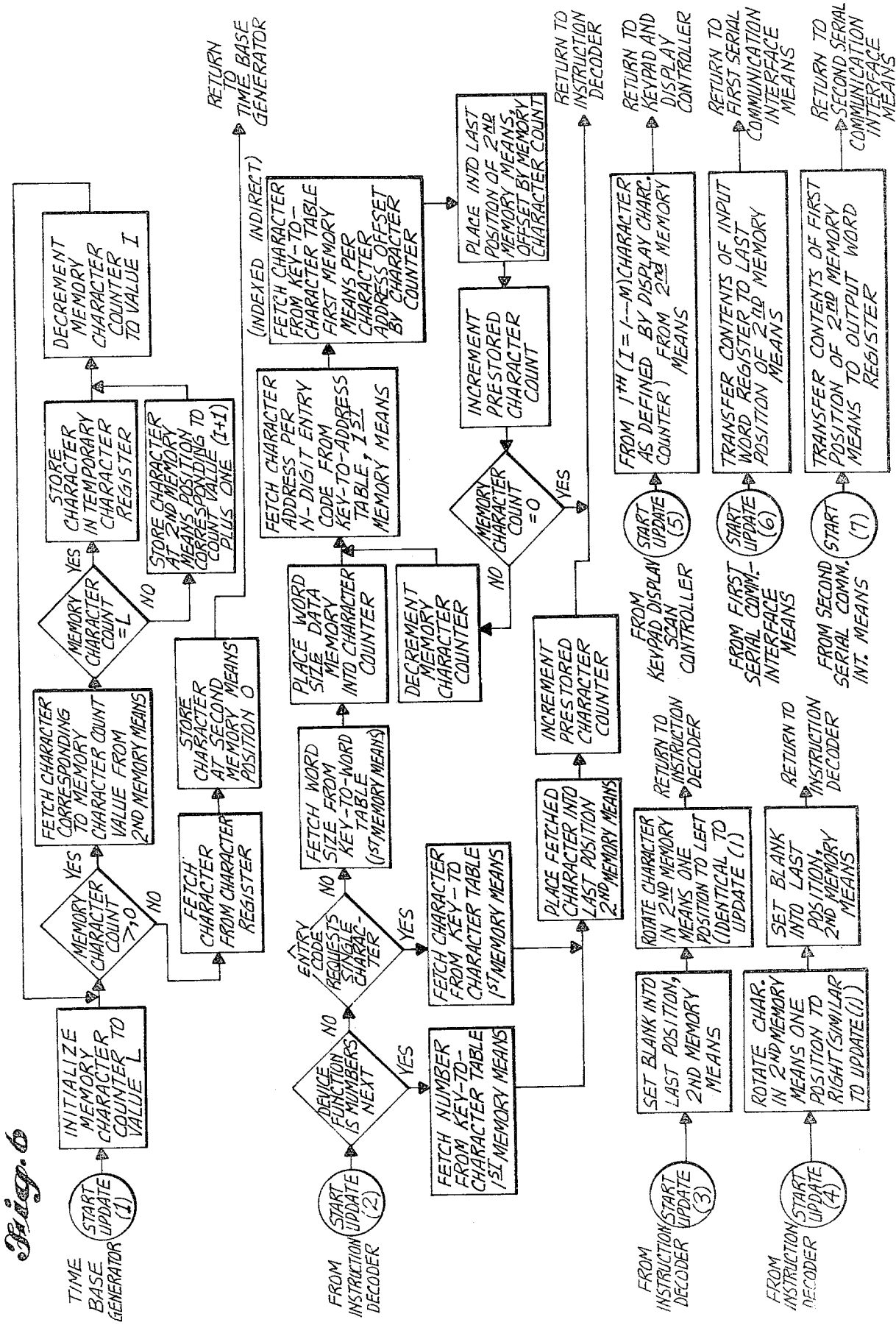
FIG. 6 is a flow diagram showing the typical operation of a memory controller means according to the present invention.
Figure 7:
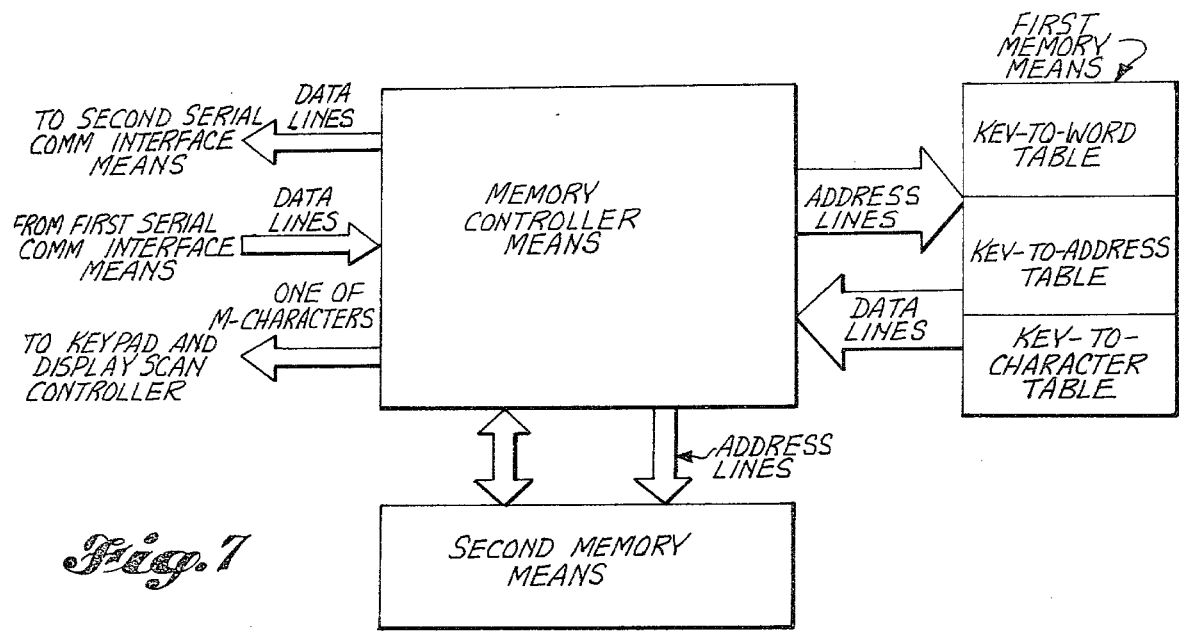
FIG. 7 is a block diagram showing a typical interface between the memory controller means and the first and second memory means.

With reference to FIGS. 6, 7, memory controller means 130 performs all operations associated with transferring alphanumeric device response, including the transferring of such responses from one memory means to another, within any particular memory means, or between a particular memory means and other elements comprising the present invention. It is to be noted with respect to FIG. 6 that several identical or similar functions shown within the memory controller means are repeated in this figure to simplify the following description, whereas these elements are combined in the implementation of the preferred embodiment.

As shown in FIG. 7, the memory controller means generates address information which is communicated to the first and second memory means (via address lines) to specify word, address, or character data stored within either means. The memory controller means is also in communication (via data lines) with the first and second serial communication interface means and the keypad and display scan controller. Logic within the memory controller means updates the address lines and routes the data presented on the data lines among the appropriate elements within the present invention (see FIG. 6). Three registers are important to this data routing and address control: specifically, the memory character counter (internal to the memory controller logic); the prestored character counter (internal to the time base generator); and, the display character counter (internal to the keypad and display scan controller).

In addition to its interfaces with the first and second memory means, the memory controller means interfaces with the time base generator 190 by responding to update requests from the time base generator. The response to such request rotates or shifts the alphanumeric device response stored in the second memory means to the left direction by one character, with the leftmost character wrapping around to the rightmost character position. This enables characters stored within the second memory means to fall within the display accessible portion of the second memory means in a user readable sequence. To accomplish the shifting function, an internal memory character counter within the memory controller means is initialized to the value of L corresponding to the size or character capacity of the second memory means (see FIG. 6). As each character within the second memory means is shifted one bit to the left, the count within the character counter is decreased by one. The first character shift, that is, with the character counter equal to the value of L, is made by storing the Lth character in a temporary character register within the memory controller corresponding to portion zero of the second memory means, thus allowing the Lth character space to be used for the next shift without destruction of the alphanumeric character. Subsequent shifts are accomplished by placing the character from the Ith position within the second memory means into the (I+1)st position where I is the value of the memory character counter. When all L alphanumeric characters within the second memory means have been shifted to the left, the memory character counter within the memory controller means will reach the value of zero causing additional logic within the memory controller means to return control of further operation to the time base generator as will be described below. If the device is in the recall function, the above procedure is repeated L times.

With reference to FIG. 6, logic within the memory controller is utilized upon initiation by the instruction decoder to request and transfer the K-character alphanumeric response stored in the first memory means to the second memory means. To accomplish this, the user selected N-digit entry code is examined by the memory controller means to determine if the memory controller is requested to transfer a single character from the first memory means, or if it is requested to transfer K-characters from the first memory means. If the memory controller is requested to transfer a single character, that character is taken from a key to character table (not shown) within the first memory means and stored within the last memory position (position L) of second memory means. Logic within the time base generator (as will be described later) is then activated by incrementing the prestored character counter. When control returns to the time base generator, the nonzero value of the prestored character count will initiate the character rotation described above, which in turn causes the character stored in the last memory portion of second memory means to be transferred out to the last character of the display means.

If the N-digit entry code has requested a multi-character transfer from the first memory means to the memory controller means, the key to character table disposed within the first memory means is not directly accessed. In this instance, the N-digit entry code is used as an index (offset) value by the memory controller means to locate the proper data location within the first memory means. The first character that is retrieved from the first memory means is not to be displayed, but rather defines the number of characters to be involved in the following multi-character transfer. This value is placed into the memory character counter whose operation is described below. The next character that is retrieved is not to be displayed, but instead defines the start address, or location of the display data to be transferred. The display data is then transferred, referencing the start address, offset by the value of the memory character. The character counter within the memory controller means is decreased in count by one as each subsequent character is transferred from the first memory means. When all characters have been transferred from the first memory means to the memory controller means, the character counter has a value of zero causing subsequent control of the device to be performed from the instruction decoder. Prior to this transition of control, however, logic within the time base generator is activated by incrementing the prestored character counter as was done in the case of the single-character transfer as described above.

As shown in FIG. 6, additional logic within the memory controller means is utilized to shift alphanumeric characters one position to the left and to set the first position blank, thus advancing the characters within display means 40. Additional logic similar to that previously described is used to enable the display means to backspace one character, to input data to the second memory means from an external device, and to transfer data from the second memory means to an external device.

First Serial Communication Interface

A first serial communication interface means 170 is in communication with the memory controller means to operably control, transfer, and receive alphanumeric responses from external devices such as tape recorders or the like.

To accomplish this, the first serial communication interface means, shown in FIG. 10, comprises buffer circuitry to transform the electrical characteristics (e.g. signal amplitude) of the incoming serial data to electrical characteristics compatible with the internal device logic. Processing logic within the interface means is in communication with the memory controller means as shown in the flow diagram of FIG. 8 and described below. Additional interface logic is in communication with the time base generator logic and provides a means by which the first serial communication interface synchronizes data inputs to the internal logic of the device. Synchronization is maintained by a request signal remaining active until an acknowledge signal is received in response to the transfer of data between the two systems. With reference to FIG. 8, the processing logic includes frequency evaluating elements to determine the validity of input data and to sense the end of an alphanumeric character. A data counter and input word register are utilized to convert the time serial input data to parallel form prior to communication with the remaining circuitry of the memory controller means.

To exchange data between an external device and the present invention, the alphanumeric character to be exchanged is represented as a serial stream of R bits, where R in the preferred embodiment is eight. Each of the R bits is further composed of a serial stream or grouping of pulses with each group being separated by quiescent intervals of some minimum duration longer than the end of character timeout (see FIG. 8). The number of pulses within each grouping between quiescent intervals defines the logic state of the represented data bit. Specifically, from five to eight pulses may represent a logic "0", and between eleven to thirteen pulses may represent a logic "1". Since both logic states are represented by pulse groupings, identification of an alphanumeric character may be accomplished by simply counting and storing bits resulting from pulse groupings, and evaluating the alphanumeric character from its binary number representation after the Rth bit has been received.

The method described above is closely followed in the preferred embodiment. After the input signal is amplified and clipped to the desired logic level, the signal is processed by logic within the first serial communications interface means as shown in FIG. 8. This logic first checks for an active pulse (signal logic state of "1"). If there is no active pulse at the time of this check, the logic repeats the check until either another active pulse is detected, or the end of character timeout occurs. If the end of character timeout occurs before another active pulse is received, the logic will request the transmission of input data (data counter contents) to the time base generator 190.

If there is an active pulse within the first serial interface at the time of the check, timing elements within the first serial interface observe the time between the current and previous active transitions to determine whether the input data rate is consistent with that of a valid signal (approximately 2 KHz). The timing elements may be easily altered as desired to change the basic data rate and apply whatever tolerance may be considered appropriate.

If the input pulse is considered to be of a valid frequency, the end of character timer is reinitialized in anticipation of the pulse returning inactive, and the data counter is updated by incrementing the count. No further action is taken by the logic until the pulse returns to an inactive state at which time the sequence of events as described above is repeated.

Further operation on the data awaits the transfer of control from the time base generator to logic within the first serial communications interface as shown in FIG. 8. At that time, the previously transmitted contents of the data counter are examined for either valid logic "0" or logic "1" state, as determined by the count value. A value of from between five to eight represents a logic "0" for which the first serial communication interface will insert the corresponding "0" into the appropriate bit position (as determined by the bit counter) at the input word register. A data counter value of from between eleven to fourteen represents a logic "1" for which the first serial communication interface will insert a "1" into the appropriate bit position of the input word register. Count values not within the limits noted above for a valid logic "0" or logic "1" are considered to represent invalid data, and the interface means will exit to the time base generator without further response.

After the appropriate logic state has been inserted into a bit position of the input word register, the bit count is examined to check whether the final bit position of the word has been updated. If it has not, the bit counter is incremented and the interface means hands control back to the time base generator. If the final bit position of the word has been updated, the word is now complete and the word is transferred into the second memory means via the memory control logic. At the same time the bit count is reset to zero in anticipation of a new data word, and the prestored character count is incremented to request the time base generator shift new data into the display. The prestored character counter is part of the time base generator logic as will be described below.

Second Serial Communication Interface

The second serial communications interface as described below is similar in operation to the first serial communications means except for the reversal of sequences and functions to accommodate its purpose as a data output.

Figure 9:
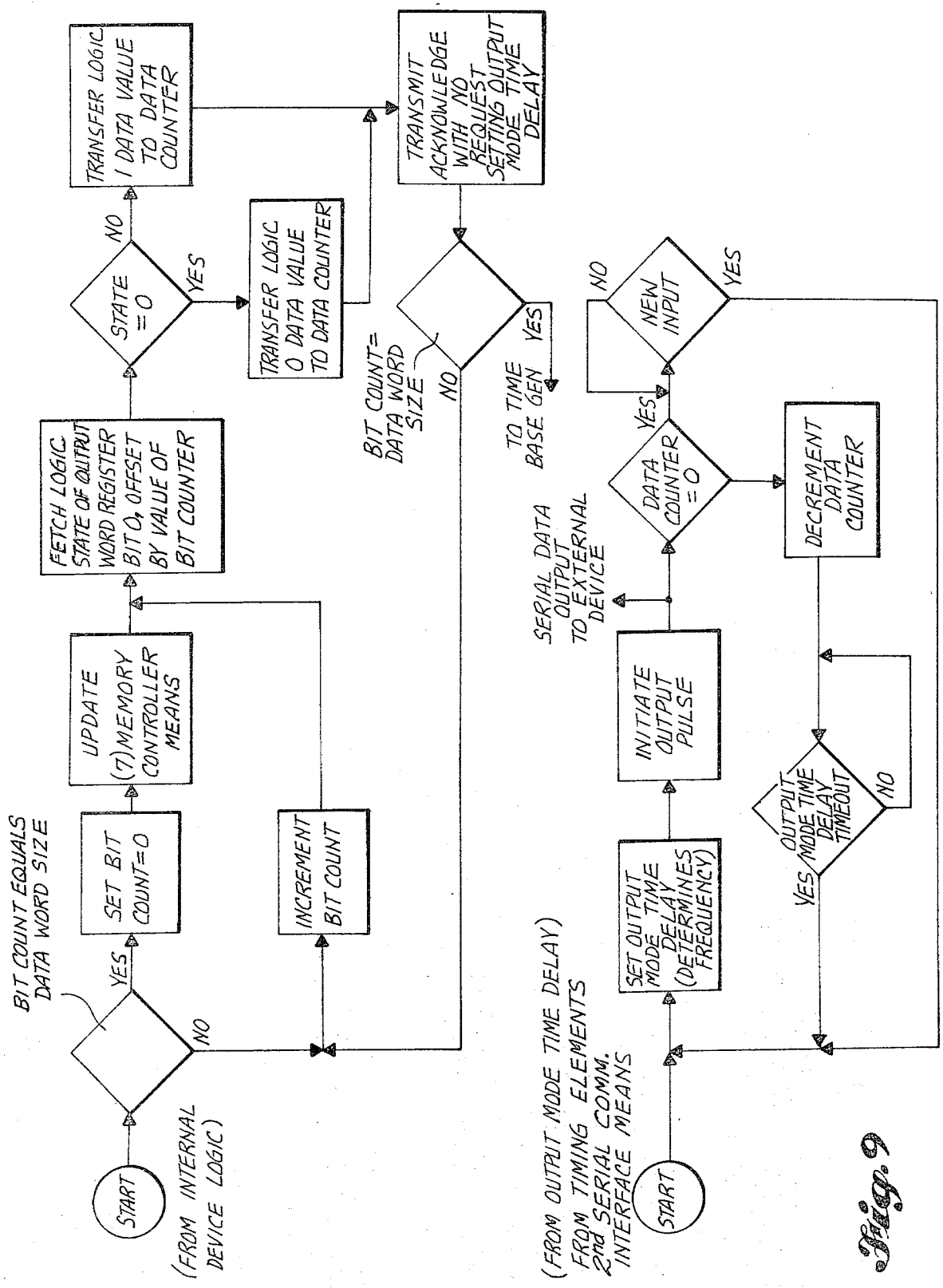
FIG. 9 is a flow diagram showing a typical operation of a second serial communication interface means according to the present invention.

As shown in FIGS. 9, 10, the time base generator logic initiates a data output, passing control to logic within the second serial communications interface means. The logic, in turn, first checks to determine, via the bit counter, whether a new alphanumeric character is being transferred out, or whether this cycle is concerned with outputting another bit of a previously started alphanumeric character. If a new alphanumeric character is to be output, the bit counter is initialized to zero and memory controller logic is utilized to fetch the character from the second memory means and store it in the temporary output word register. If another bit of a previous alphanumeric character is to be output, additional logic will increment the bit count, by passing the character fetch. In either case, this logic will next retrieve the appropriate bit (as specified by the updated bit count) from the output word register and transfer the correct logic state to a data counter within the second serial communications interface. The logic will then loop back to its start location, continuing to output data bits to the data counter until all bits of that character have been output at which time control is passed back to the time base generator. It is important to note that the transfer of data to the data counter is accompanied by an output acknowledge that is identical to the input acknowledge of the first serial communications interface means. The logic of the second serial communications interface means is so constructed that it interprets the acknowledge without a prior request active signal as an initiating stimulus for outputting data. The logic, as shown in FIG. 9, then operates to output data independently of other system logic. A frequency determining output mode time delay is set, after which a grouping of pulses are output separated in time by the time delay value (the number of pulses corresponds to the value initially set into the data counter). When the proper pulse count has been achieved, the logic remains in a quiescent state awaiting another input stimulus. The output pulses are buffered, as shown in FIG. 10, prior to interfacing with an external device.

Relay Output Controller

Figure 12:
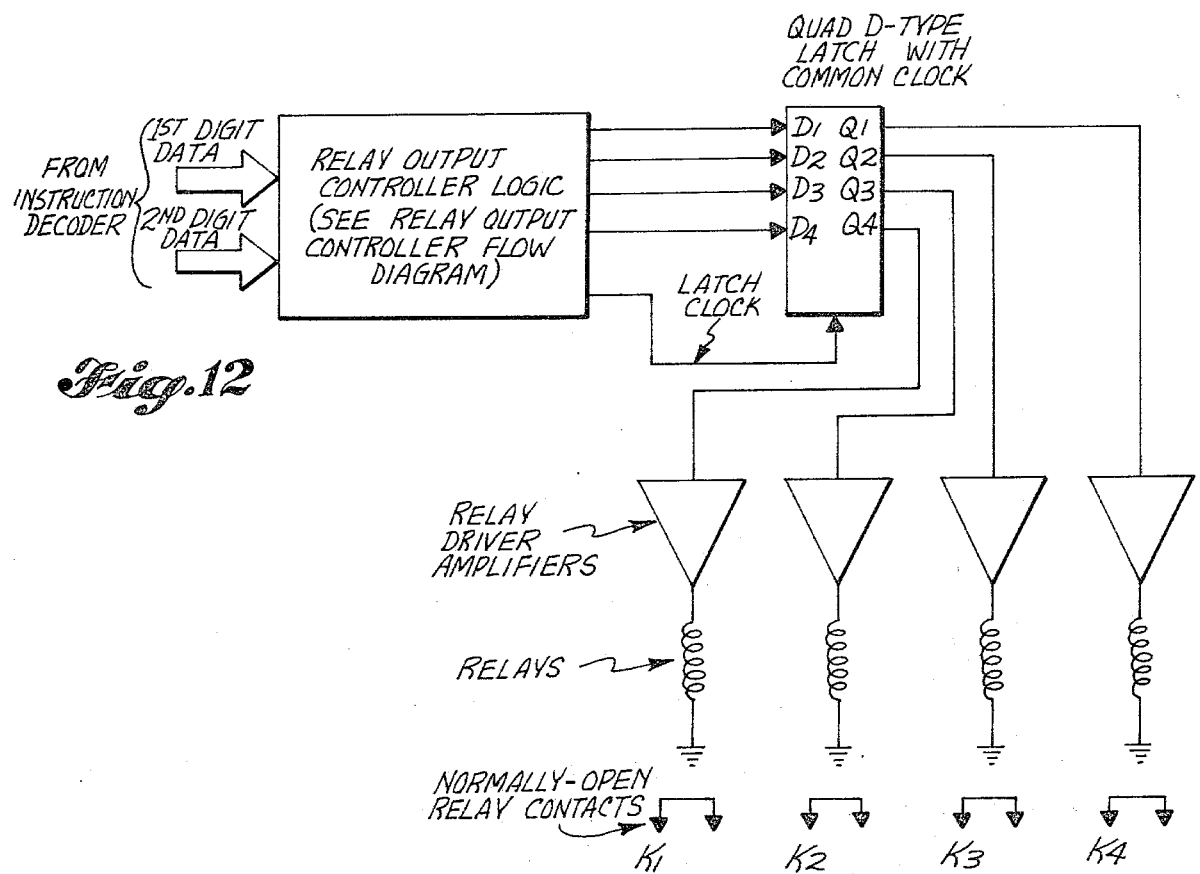
FIG. 12 is a block diagram showing a typical implementation of a relay output controller.
Figure 11:
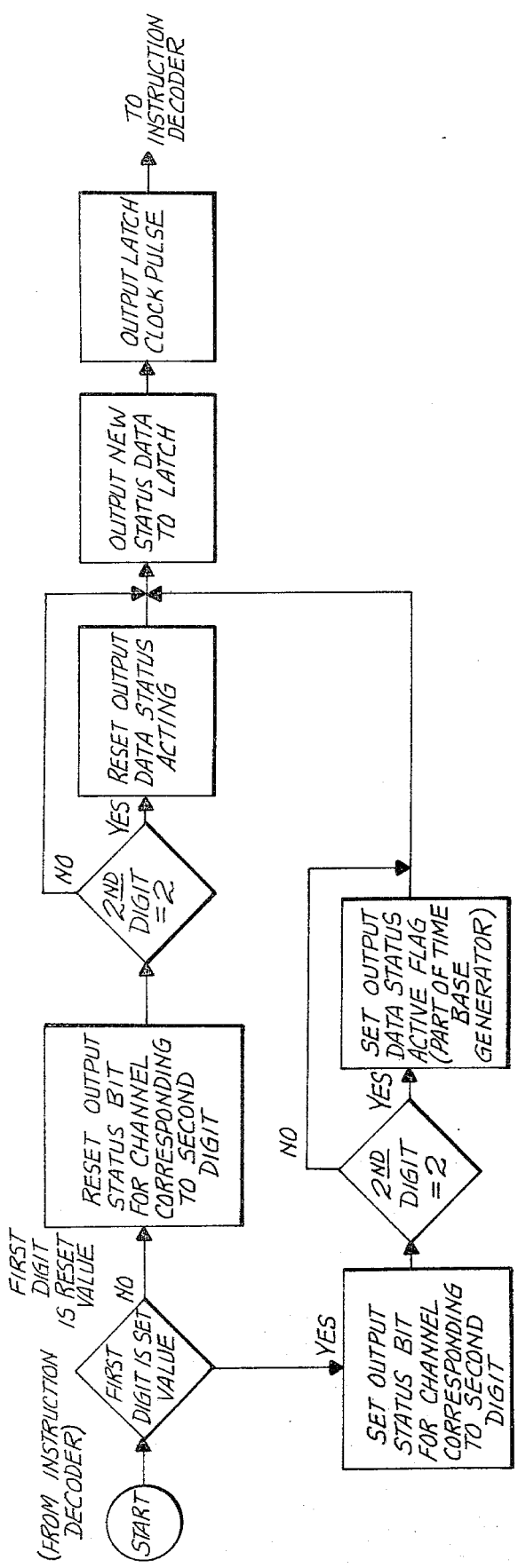
FIG. 11 is a flow diagram showing a typical operation of a relay output controller according to the present invention.

Relay output controller 140 (see FIG. 2) controls the operability of external devices such as tape recorders or the like. As shown in FIG. 12, the relay output controller is in communication with the instruction decoder from which it receives the input data and actuation stimulus. The relay output controller responds to the input via the control logic as shown in FIG. 11 and described below by updating the quad D-type status latch in FIG. 12. The outputs of the status latches operate the output relays whose contacts are available to the user to control the operability of external devices.

If logic within the instruction decoder interprets an N-digit entry code as appropriate to activate the relay output logic, it will hand over control to the relay output controller which proceeds to examine the binary value of the first digit of the N-digit entry code. If this digit has a value of eight, the binary value of the second digit of the entry code defines the output (one to four) to be set. If the first digit is a seven, the binary value of the second digit of the entry code defines the output to be reset. After performing the operation described above (by setting or resetting the appropriate output status bit), the relay output logic next re-examines the second digit for a value of two. The output data status active flag (part of time base generator) is then set or reset as appropriate. The output logic then transfers the data from the output status register to a status latch by pulsing a latch clock as shown in FIGS. 11, 12. The latch output data is then buffered to the current levels appropriate to relay actuation and transmitted to relay coils, the contacts of which serve as the relay control outputs.

Feedback Switch Means

The user operable feedback switch means 30 is operable during the time a key is displayed to duplicate the function of the keyboard means 20. With reference to FIG. 14, the feedback switch controller is in communication with the keypad and display scan controller which provides the feedback switch means with feedback switch status updates. The feedback switch means is also in communication with the time base generator which provides operability stimulus at regular time intervals. The feedback switch means interprets the feedback switch status data by logic as described below to update the feedback display count in sequential increments to convert the display counter code to the format required by the display. The feedback switch means also outputs to the display and updates the instruction decoder as required. Elements comprising the feedback controller logic include a sequence active status register, a key counter (identical to the feedback display count), and a sequence timer counter to control the update rate of the feedback display.

At regular time intervals control of the communication device is passed from the time base generator 190 to logic with the feedback switch means. The feedback switch controller logic then operates on the stored data regarding the feedback switch status as described below. If the slowest rate feedback switch is inactive, all of the feedback switches are considered inactive. If, in addition, the feedback switch was previously inactive (sequence active status not set upon entrance to the feedback switch controller logic), the device is considered to be inactive and control is handed back to the time base generator. If, however, the feedback switch has just become inactive, the transition to inactivity is considered to be identical to activation of a keypad switch. Therefore, after resetting the sequence active status (to ensure that only one switch closure is detected per transition), the feedback switch will force the present key count (feedback display data) into the switch decode logic to simulate keyboard operation, and to pass control to the instruction decoder as if a keyboard switch has been active.

If the feedback switch has been active, the sequence active status will be set preparatory to marking the first transition to inactive as described above. As shown in FIG. 13, each time the sequence timer counter reaches zero, the key count is updated causing the feedback display to advance by one count.

Once the key count has been updated the feedback switch logic will relinquish control to the time base generator. At the same time, as shown in FIG. 14, the key count is decoded into seven segment data appropriate to the display and is amplified and transmitted to the seven segment feedback display. As actually implemented in the preferred embodiment, the binary to seven segment code conversion is accomplished by lookup table within a microcomputer.

When an active key has been detected and decoded by either the keypad and display scan controller or the feedback switch logic, that data is transmitted to the instruction decoder logic for interpretation and initiation of the appropriate system response. As implemented in FIG. 13, the feedback switch logic will interface with a multiplicity of feedback switches to provide a switch controllable feedback display update rate.

Time Base Generator

The operability of the functional elements identified in FIG. 2 are regulated in operation and control with respect to their relationship to each other by time base generator 190. The time base generator is shown in greater detail in the flow diagram of FIG. 15. With respect to that diagram, entrance is made to the functional operation of the time base generator directly upon a reset condition which is accomplished by actuation of reset switch 25 shown in FIG. 1. Once the time base generator has been entered, the functional exit from the time base generator to the other elements identified in FIG. 2 is carried out in an orderly manner.

The time base generator provides the major timing and intersubsystem control required for the present invention. To accomplish this function, the time base generator consists of a master oscillator and clock pulse generator, and additional logic as shown in FIG. 15 and described below. Key elements within the logic include a prestored character counter, the value of which serves as data to regulate the routing of system control, time delay elements, and a status active register. This logic is in communication with the keypad and display scan controller, first and second serial communications interfaces, memory controller means, and feedback switch controller to regulate the operation.

With reference to FIG. 15, the first operation of the time base generator when entered into from a reset condition after clearing all elements of the communication device is to start a time delay countdown. Once initiated, the timer controlling the time delay countdown operates independently of and essentially in parallel with all other logic elements within the device until completion of the countdown at which point the timer reasserts control over the functional logic in the device. Once the timer has reasserted control over the communication device, the time delay is reinitialized to assure future control, then the state of the prestored character counter is observed as shown in FIG. 15.

The prestored character counter is an internal counter that is updated to a positive, non-zero value whenever the displayed data is incomplete, a state that implies that alphanumeric characters residing in the second memory means await being shifted out into the display accessible portion (first M characters of the second memory means). If the displayed character count is zero, the time base generator logic will bypass the memory controller and serial communications interface functions and proceed with updating the feedback switch function. Otherwise, the executive logic will decrement the prestored character count toward zero by one count in anticipation of shifting one character into the display access region of the second memory means, than hand control over to the memory controller to accomplish that purpose. After the memory controller has shifted the data in the second memory means by one character as described, it returns system control back to the time base generator. In every case where the user has previously enabled output number two of relay output controller 140 a character is transmitted, via the second serial communications interface means, to the external device connector while shifting that character into the display region of the second memory means. This process is shown on FIG. 15 as the observation by the time base generator logic of the state of the output data status active register and subsequent updating of the second serial communications interface means if it is active. It may be noted that this occurs immediately after the memory controller was updated to shift a character into the display region of the second memory means. As implemented and noted in the preceding description, the updating of the memory (to shift the displayed data) and the second serial communications interface are under the control of the timer activated portion of the time base generator so that these updates will occur at uniform, repeatable time intervals.

The feedback switch is under the same timing control as the functions previously considered due to the sequential display which must also be incremented at regular time intervals.

After the feedback switch controller has been updated, the remaining functions do not require time synchronization. As may be noted in FIG. 15, provided that input data is not being received from an external device, the time base generator maintaining a loop to permit continuous successive reactuations of the keypad and display scan controller. This loop is broken only at the end of each time delay interval or as required to service the first serial communications interface means. Therefore, during the majority of time the system operation is actually under the control of the keypad and display controller.

I claim:

1. A communication device comprising:
(a) keyboard means having a plurality of keys operable to establish the communication device operational mode and entry code to thereby create the alphanumeric characters forming the message to be communicated, or to select one of a plurality of predetermined messages to be communicated;
(b) user operable feedback switch means including a display sequentially presenting to the user a representation of each key on said keyboard means, said feedback switch means being operable during the time a key is represented to replicate actuation of the corresponding key on said keyboard means;
(c) display means presenting either the message to be communicated as it is being created by the user or the selected predetermined message; and,
(d) housing means having a first face for mounting said keyboard means and said user operable feedback switch means including said sequential display means, and a second face at an acute angle with respect to said first face for mounting said display means.

2. The communication device of claim 1, further including means responsive to said keyboard means or said user operable feedback switch means for controlling the operability of a plurality of external devices.

3. The communication device of claim 1, wherein said user operable feedback switch means is separate and apart from the communication device.

4. The communication device of claim 1, further including a first interface means for transferring an alphanumeric character or a message to be communicated from an external device to the communication device for subsequent presentation by said display means whenever the external device is operational.

5. The communication device of claim 1, further including second interface means for outputting to an external device either the message being created by the user or one of a plurality of predetermined messages selected by the user in response to the operability of predetermined keys.

6. The communication device of claim 1, wherein said sequential display means presents each key from said keyboard means to the user at one of a plurality of user selectable display rates.

7. A communication device comprising:
(a) a keyboard means having a first plurality of keys operable to select the communication device function, and a second plurality of keys operable to select an N-digit entry code for the communication device;
(b) sequential display means presenting to the user a representation of each key from said first and said second plurality of keys, including a user operable feedback switch means operable during the time that key is represented to the user to replicate activation of the first and second plurality of keys on said keyboard means;

(c) decoder means in communication with said keyboard means and said feedback switch means being operable to decode the device function and the N-digit entry code selected from either said keyboard means or said feedback switch means;

(d) first memory means storing a plurality of K-character alphanumeric device responses each being outputtable in response to predetermined decoded device functions and N-digit entry code;

(e) memory controller means in communication with said decoder means responsive to the decoded device function and N-digit entry code, said controller means being in communication with said first memory means and requesting said K-character alphanumeric device responses from same, and inputting and storing same;

(f) M-character alphanumeric display means in communication with said controller means displaying said K-character alphanumeric device responses communicated from said first memory means to said controller means in response to the decoded device function and N-digit entry code; and, (g) housing means having a first face for mounting said keyboard means and said means sequentially displaying each key therein including said feedback switch, and a second face at an acute angle with respect to said first face for mounting said M-character alphanumeric display means.

8. The device of claim 7, including second memory means in communication with said memory controller means for storing each K-character alphanumeric device response and sequentially outputting M-characters to said memory controller means until all K-characters have been outputted.

9. The device of claim 7, further including first serial interface means being in communication with said memory controller means transferring a serial alphanumeric output from an external device to said memory controller means whenever the external device is operable.

10. The device of claim 9, further including output controller means responsive to decoded predetermined device functions and N-digit entry codes for controlling the operability of an external device.

11. The device of claim 9, further including second serial interface means in communication with said decoder means for serially outputting device responses to an external device in response to decoded predetermined device functions and N-digit entry codes.

12. The device of claim 7, wherein said user operable feedback switch is operable by switch means separate and apart from the device.

13. The device of claim 7, wherein J keys within said first plurality of keys in conjunction with J keys within said second plurality of keys are operable for selecting the N-digit entry code.

14. The device of claim 7, wheren the plurality of K-character alphanumeric device responses has from between one to thirty characters.

15. The device of claim 7, wherein the plurality of N-digit entry codes depends upon the selected device function and has from between one to two digits.

16. The device of claim 7, wherein said M-character alphanumeric display means displays from between one to twelve alphanumeric characters at one time.

17. The device of claim 16, wherein said M-character alphanumeric display means sequentially shifts the M-characters displayed from right to left.

18. The device of claim 8, wherein said second memory means sequentially outputs one character of the K-character alphanumeric device response to said controller means.

19. The device of claim 7, wherein the sequential display means presents each key from said first and second plurality of keys to the user at one of a plurality of user selected display rates.

* * * * *